Figure 1:
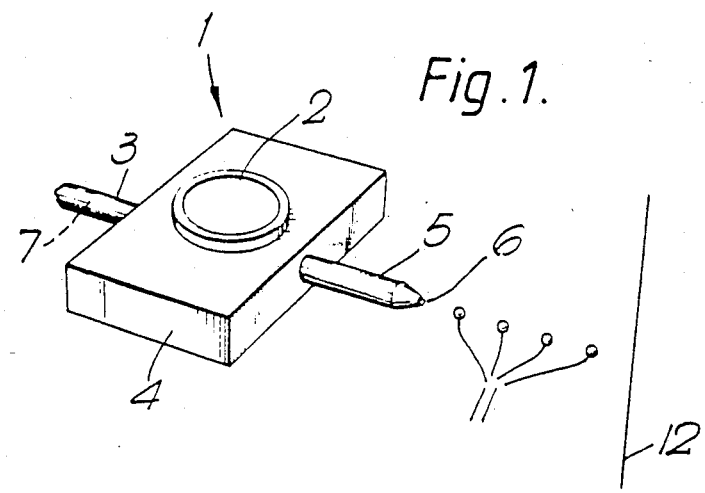

United States Patent [19]

Baxter et al.

[11] Patent Number: 4,738,721
[45] Date of Patent: Apr. 19, 1988

[54] INK COMPRISING A WATER-SOLUBLE TRIPHENDIOXAZINE DYE

[75] Inventors: Anthony G. W. Baxter, Manchester; Stephen B. Bostock, Bury; David Greenwood, Oldham, all of England

[73] Assignee: Canon Kabushiki Kaisha, Tokyo, Japan

[21] Appl. No.: 943,090

[22] Filed: Dec. 18, 1986

Related U.S. Application Data

[62] Division of Ser. No. 765,000, Aug. 12, 1985.

[30] Foreign Application Priority Data

Aug. 24, 1984 [GB] United Kingdom ............... 8421555

[51] Int. Cl.⁴ .............................................. C09D 11/00
[52] U.S. Cl. ........................................ 106/22; 106/20
[58] Field of Search ..................... 106/22, 20; 544/74

[56] References Cited

U.S. PATENT DOCUMENTS

| | | | |
|---|---|---|---|
| 2,763,641 | 9/1956 | Seitz et al. | 544/76 |
| 2,954,378 | 9/1960 | Pugin et al. | 544/198 X |
| 3,642,720 | 2/1972 | Kray et al. | 544/198 X |
| 3,846,141 | 11/1974 | Ostergren et al. | 106/22 |
| 3,883,523 | 5/1975 | Parton | 544/198 X |
| 3,996,221 | 12/1976 | Leng et al. | 544/76 |
| 4,024,096 | 5/1977 | Wachtel | 106/22 |
| 4,142,905 | 3/1979 | Cooke | 106/22 |
| 4,335,242 | 6/1982 | Wiezer et al. | 544/198 |
| 4,472,575 | 9/1984 | Renfrew | 544/76 |
| 4,514,399 | 4/1985 | Regnier et al. | 544/198 X |

FOREIGN PATENT DOCUMENTS

| | | | |
|---|---|---|---|
| 3344253 | 4/1985 | Fed. Rep. of Germany | 544/99 |
| 1278026 | 6/1972 | United Kingdom . | |

Primary Examiner—Amelia Burgess Yarbrough
Attorney, Agent, or Firm—Cushman, Darby & Cushman

[57] ABSTRACT

A water-soluble dye, free from cellulose reactive groups, of the formula:

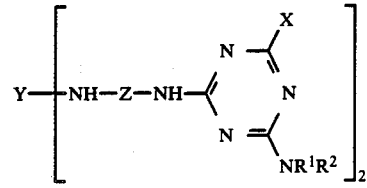

wherein
$R^1$ is $-(C_aH_{2a}O)_m(C_bH_{2b}O)_nH$, $R^2$ is H or $-(C_aH_{2a}O)_m(C_bH_{2b}O)_nH$, or
$R^1$ and $R^2$ together with the nitrogen atom form a morpholine ring
$a$ and $b$ are different and from 1 to 8
$m$ is from 1 to 10;
$n$ is from 0 to 9;
Y is a triphendioxazinylene (TPD) group;
M is H, ammonium, or a metal;
X is $NR^1R^2$, alkoxy, $NR^3R^4$ in which $R^3$ and $R^4$ are each independently selected from H, alkyl, aryl and heteroaryl, or the residue of a mono- or dis-azo chromophore comprising benzene, naphthalene or mono- or bi-cyclic heteroaryl diazo and coupling components, linked to the triazine nucleus through a primary or secondary amine linking group; and
Z is an alkylene, arylene or aralkylene group, suitable for the preparation of a printing ink, especially for ink jet printing.

6 Claims, 1 Drawing Sheet

INK COMPRISING A WATER-SOLUBLE TRIPHENDIOXAZINE DYE

This is a division of application Ser. No. 765,000, filed Aug. 12, 1985.

This specification describes an invention relating to a water-soluble dye and to an ink containing the dye which is suitable for use in ink jet printing.

According to the present invention there is provided a water-soluble dye, free from cellulose reactive groups, of the formula:

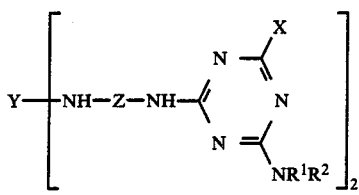

wherein
$R^1$ is —$(C_aH_{2a}O)_m(C_bH_{2b}O)_nH$,
$R^2$ is H or —$(C_aH_{2a}O)_m(C_bH_{2b}O)_nH$, or
$R^1$ and $R^2$ together with the nitrogen atom form a morpholine ring
a and b are different and from 1 to 8
m is from 1 to 10;
n is from 0 to 9;
Y is a triphendioxazinylene (TPD) group;
X is $NR^1R^2$, alkoxy, $NR^3R^4$ in which $R^3$ and $R^4$ are each independently selected from H, alkyl, aryl heteroaryl, or the residue of a mono- or dis-azo chromophore comprising benzene, naphthalene or mono- or bi-cyclic heteroaryl diazo and coupling components, linked to the triazine nucleus through a primary or secondary amine linking group; and
Z is an alkylene, arylene or aralkylene group.

If the dye contains more than one —$(C_aH_{2a}O)_m(C_bH_{2b}O)_nH$ group these may be different, but are preferably the same. It is preferred that, in the group $NR^1R^2$, a and b are from 2 to 6 and more preferably 2 or 3, m is 1 or 2 and n is 0 or 1 or that $R^1$ and $R^2$ together with the nitrogen atom form a morpholine ring. Examples of groups represented by $R^1$ and $R^2$ are hydroxyethyl, 3-hydroxy-n-propyl, 6-hydroxy-n-hexyl and 3-(2-hydroxyethoxy)propyl. It especially preferred that $R^1$ is hydroxyethyl and $R^2$ is H; $R^1$ and $R^2$ are both hydroxyethyl or $NR^1R^2$ is morpholino.

The TPD group is preferably of the formula:

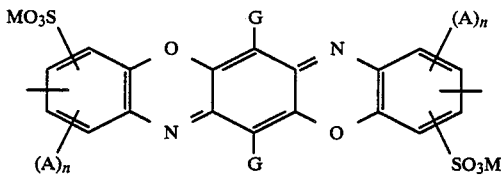

wherein $(A)_n$ represents n substituents A each of which may be independently halogen, $C_{1-4}$-alkyl or $C_{1-4}$-alkoxy, n is 0 to 3, M is is H, ammonium, or a monovalent metal and G is halogen, preferably chlorine or bromine. It is preferred that n=0 and that the $SO_3M$ groups are in alpha positions adjacent to the nuclear oxygen atoms.

Where X is $NR^3R^4$, $R^3$ is preferably H or $C_{1-4}$-alkyl and $R^4$ is preferably H, $C_{1-4}$-alkyl, mono- or bi-cyclic aryl or mono- or bi-cyclic heteroaryl. Where $R^4$ is mono- or bi-cyclic aryl, it is preferably phenyl or naphthyl, carrying at least one sulphonate group and optionally carrying other substituents. Examples of other substituents for $R^4$ are $C_{1-4}$-alkyl, $C_{1-4}$-alkoxy, $C_{1-4}$-alkylcarbonylamino, mono- or di-$C_{1-4}$-alkylamino, aminosulphonyl or carbonyl, mono- or di-$C_{1-4}$-alkylaminosulphonyl or carbonyl, nitro, phenylamino, ureido, halogen, especially chlorine, carboxylate and hydroxy.

Where X is the residue of a mono- or dis-azo chromophore carrying a diazotisable amino group and comprising benzene, naphthalene or mono- or bi-cyclic heteroaryl diazo and coupling components, it is preferably the residue of a monoazo dye comprising benzene and naphthalene diazo and coupling components preferably carrying at least one sulphonate group and optionally carrying other substituents. Examples of other substituents are those exemplified above as substituents for $R^4$.

The amine linking group in X may be of the general formula —$NR^3$— in which $R^3$ is H, alkyl, preferably $C_{1-4}$-alkyl, or aryl, preferably phenyl, and it is preferred that $R^3$ is H or $CH_3$.

When the divalent group Z is or contains an arylene group this is preferably phen-1,4-ylene which may be substituted by any of the optional substituents mentioned above for $R^4$, especially sulphonate. Examples of groups represented by Z are $C_{1-4}$-alkylene, especially ethylene and propylene, and optionally substituted phen-1,4-ylene, especially phen-1,4-ylene, 2-sulphophen-1,4-ylene and 2,5-disulphophen-1,4-ylene.

Water-solubility is enhanced by the presence of acid groups such as carboxylate, COOM, and sulphonate, $SO_3M$, groups and also by $NR^1R^2$ groups, especially where $R^1$ and/or $R^2$ are hydroxyethyl or $R^1$ and $R^2$ are morpholino. It is preferred that the dye carries at least five and more preferably at least such six water-solubilising groups. However, sulphonate groups are generally superior to carboxylate acid groups in confering water-solubility and it is thus preferred that each azo chromophore attached to the triazine nucleus carries at least two, and more preferably at least three sulphonate groups, and that, where the dye contains two azo chromphores, the whole dye carries at least five and more preferably at least six sulphonate groups.

The species M, associated with the acid groups, may be any monovalent cation which forms a stable water-soluble salt with the dye and is preferably an alkali metal, such as sodium potassium or lithium or ammonium, including substituted ammonium, e.g mono, di, tri and quaternary alkyl- and substituted-alkyl-ammonium, such as trimethylammonium and tetra(hydroxyethyl)ammonium.

Examples of especially preferred water-soluble dyes are the following acid dyes:

Dye 1
A dye of Formula I wherein $R^1$ is hydroxyethyl $R^2$ is H, Z is —$C_2H_4$—, X is 5-hydroxy-6-(2-sulphophenylazo)-7-sulphonaphth-2-ylimino (Na salt) and Y is 4,11-disulpho-6,13-dichloro-triphenodioxazin-3,10-yl (Na salt).

Dye 2
A dye of Formula I wherein $R^1$, $R^2$, Z and Y are as for Dye 1 and X is 4-(2,5-dimethyl-4-[2,5-disulphophenylazo]phenylazo)-3-ureidophen-1-ylimino (Na salt).

Dye 3

A dye of Formula I wherein $R^1$ and $R^2$ are hydroxyethyl, Y and Z are as in Dye 1 and X is 6-sulpho-7-(3,6,8-trisulphonaphth-2-ylazo)-8-hydroxynaphth-2-ylimino (K salt).

Dye 4

A dye of Formula I wherein $R^1$ and $R^2$ are hydroxyethyl, Y and Z are as in Dye 1 and X is 5-hydroxy-6-(2-sulpho-4-methoxyphenylazo)-7-sulphonaphth-2-yl-N-methylimino (K salt).

Dye 5

A dye of Formula I wherein $R^1$ is 6-hydroxyhexyl, $R^2$, Y and Z are as in Dye 1 and X is 2-sulpho-4-methylphenylimino (Na salt).

Dye 6

A dye of Formula I wherein $R^1$ is 3-(2-hydroxyethoxy)propyl, $R^2$, Y and Z are as in Dye 1 and X is 4-[1-(4-sulphophenyl)-3-carboxypyrazolin-5-on-4-ylazo]-3-sulphophenylimino (Na salt).

Dye 7

A dye of Formula I wherein $R^1$, $R^2$, Y and Z are as in Dye 1 and X is $NR^1R^2$.

Dye 8

A dye of Formula I wherein $R^1$, $R^2$, Y and Z are as in Dye 7 and X is $NH_2$.

Dye 9

A dye of Formula I wherein $R^1$, $R^2$ and Y are as in Dye 7, X is 2,5-disulphophenylimino and Z is 2,5-disulphophen-1,4-ylene.

Dye 10

A dye of Formula I wherein $R^1$, $R^2$, X and Y are as in Dye 9 and Z is prop-1,3-ylene.

Dye 11

A dye of Formula I wherein $R^1$, $R^2$, Y and Z are as in Dye 1 and X is 2-methyl-4-(2,5-disulphophenylazo)-5-methoxyphenylimino (Na salt).

The dye of the present invention may be prepared by (i) reacting a compound of the formula:

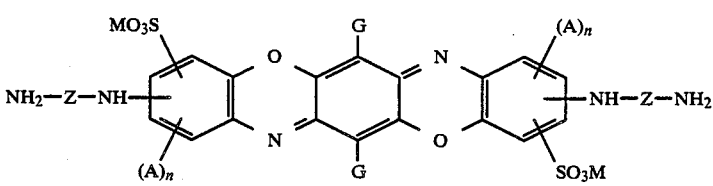

III with two molecular proportions of cyanuric chloride under conditions such that two triazine nuclei become attached to each TPD group through the diamine linking group, —NH—Z—NH—, by displacement of a single chlorine atom, (ii) displacing a second chlorine atom from each triazine nucleus by reaction with a compound XH, under conditions such that a single chlorine atom is replaced by X and (iii) displacing the final chlorine atom on each triazine nucleus by reaction with $HNR^1R^2$, under conditions such that the third chlorine atom is replaced by $NR^1R^2$. Where X is $NR^1R^2$, the second and third chlorine atoms of each triazine nucleus may be replaced simultaneously.

The present invention in so far as it relates to the dye is further illustrated with reference to the following Examples in which all parts and percentages are by weight, unless otherwise indicated.

EXAMPLE 1

The monoazo dyestuff, 2-(2-sulphophenylazo)-3-sulpho-6-amino-naphth-1-ol (13g, 0.02M) was dissolved in water (100 cm$^3$) at pH 6.5 and ice (50 g) added. A solution of cyanuric chloride (3.7 g, 0.02M) in acetone (30 cm$^3$) was added at below 2° C. The mixture was stirred 0.25 hours at this temperature and 8% sodium hydroxide solution (9 cm$^3$) added to a pH value of 6.5 which was maintained a further 1 hour. An orange suspension of a dichloro-triazine derivative was obtained.

The TPD dyebase, 3,10-diaminoethylimino-4,11-disulpho-6,13-dichlorotriphenodioxazine (Na salt) (26.9 g, 0.01M) was stirred in water (100 cm$^3$) and 8% sodium hydroxide solution (10 cm$^3$) at pH 9.0. and added to the suspension of the dichlorotriazine derivative. The mixture was heated to 25°–30° C. and the pH maintained at pH 8.4–8.6 for 4 hours using 8% sodium hydroxide solution (100 cm$^3$). Ethanolamine (6 g) was added to the solution thus formed and the reaction mixture heated to 50°–55° C. for 7 hours. The solution was cooled to room temperature and ethanol (250 cm$^3$) added and the precipitated dye collected by filtration and washed with ethanol/water (1:1).

The paste was reslurried in ethanol/water (2:1, 300 cm$^3$) refiltered and washed with ethanol/water (1:1). The paste was dissolved in distilled water (200 cm$^3$) and the solution subjected to dialysis to remove inorganic material. The resulting solution was evaporated to dryness at 50° C. in vacuum to yield Dye 1, i.e. the dye of Formula I wherein $R^1$ is hydroxyethyl $R^2$ is H, M is Na, Z is —$C_2H_4$—, Y is 4,11-disulpho-6,13-dichloro-triphenodioxazin-3,10-yl (Na salt) and X is 5-hydroxy-6-(2-sulphophenylazo)-7-sulphonaphth-2-ylamino (Na salt).

EXAMPLE 2

Using the same process and reaction conditions described in Example 1 the triphendioxazine dyebase of Formula B was reacted with the reaction product of cyanuric chloride and the azo dye 3-ureido-4-(4-[2,5-disulphophenylazo]-2,5-dimethylphenylazo)aniline The resulting solution of the dye thus obtained was again subjected to dialysis in order to remove inorganic compounds and the solution evaporated to dryness at 50° C. to yield Dye 2, i.e. the dye of Formula I wherein $R^1$, $R^2$, M, Z and Y are as for Dye 1 and X is 3-ureido-4-(4-[2,5-disulphophenylazo]-2,5-dimethylphenylazo)phen-1-ylamino (Na salt).

EXAMPLE 3

Using the same process and reaction conditions described in Example 1, the triphendioxazine dyebase of formula B was reacted with the reaction product of cyanuric chloride and 6-sulpho-7-(3,6,8-trisulphonaphth-2-ylazo)-8-hydroxynaphth-2-ylamine, and then with diethanolamine to yield the dye hereinbefore identified as Dye 3, i.e. the dye of Formula I wherein wherein Z and Y are as in Dye 1 except that Y is the K salt, $R^1$ and $R^2$ are hydroxyethyl, and X is 6-sulpho-7-(3,6,8-trisulphonaphth-2-ylazo)-8-hydroxynaphth-2-ylimino (K salt).

EXAMPLE 4

Using the same process and reaction conditions described in Example 1, the triphendioxazine dyebase of formula B was reacted with the reaction product of cyanuric chloride and 5-hydroxy-6-(2-sulpho-4-methoxyphenylazo)-7-sulphonaphth-2-yl-N-methylamine, and then with diethanolamine, to yield the dye hereinbefore identified as Dye 4, i.e. the dye of formula 1 wherein Z, Y, $R^1$ and $R^2$ are as in Dye 3, and X is 5-hydroxy-6-(2-sulpho-4-methoxyphenylazo)-7-sulphonaphth-2-yl-N-methylimino (K salt).

INK

The aforementioned water-soluble dyes of the present invention are adapted for use in inks, particularly writing and printing inks based upon water and/or water-miscible organic solvents, such as alkanols and glycols, and especially inks suitable for ink-jet printing wherein the ink is ejected from an orifice of a recording head in the form of liquid droplets.

For recording on paper or the like with writing tools (fountain pen, felt pen, etc.), it is conventional to use inks which are solutions of dyes in water or a water miscible organic solvent and inks of similar composition are also used in ink-jet printing.

In ink-jet printing, droplets of ink are generated in various ways and deposited on a substrate to effect a record. Suitable inks comprise, as essential components, a recording agent (usually a dye or a pigment) and a liquid vehicle (usually water, an organic solvent or mixtures thereof) and, as optional components, various other additives.

Ink-jet printing may be classified into various systems depending on the method for generation of ink droplets and the method for controlling the flight direction of ink droplets. An example of a device in accordance with one system is shown in FIG. 1.

The device shown in FIG. 1 operates by providing a printing signal at the print head section having a piezoelectric oscillator and generating ink droplets corresponding to said signal. In FIG. 1, a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is applied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

Figure 2:
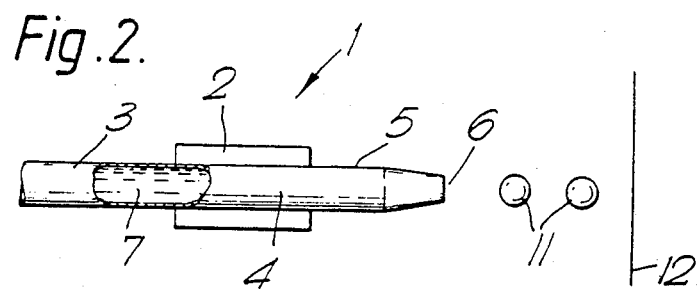

An example of another type of device using the same system is shown in FIG. 2, in which a tubular liquid chamber 4 links the inlet and outlet lines 3, 5 and a cylindrical piezoelectric oscillator 2 is arranged around the outer peripheral portion of the chamber 4. The mechanism for generation of ink droplets is essentially the same as in the device as shown in FIG. 1.

In another system, charged droplets are continuously generated but only a proportion of the droplets are selected for recording.

Figure 3:
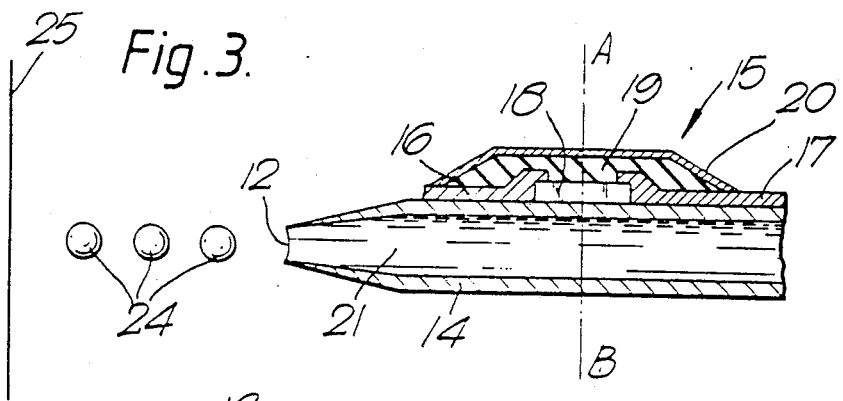
Figure 4:
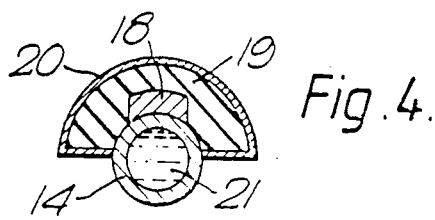

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-section view taken on the line A-B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome heating resistor 18 the ends of the electrodes 16, 17 and the resistor 18 being encased in a layer of insulant 19 and a protective envelope 20.

In operation an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each corresponding to a electric pulse, directed at the substrate 25.

As ink-jet printing generates little noise and allows high speed multi-colour operation without the need for special dye fixation treatments, a number of different ink-jet printing systems are currently being intensively investigated.

Inks for any of various types of ink-jet printing systems need to meet the following criteria:

(1) Physical properties of the ink, such as viscosity and surface tension, are each within a defined range.

(2) All solutes have good solubility in the ink medium to give solutions having good stability which do not plug the fine ejecting orifices (hereinafter referred to as "solution stability").

(3) The recording agent gives images of sufficient optical density.

(4) The ink does not change in physical properties or deposit solid matter during storage.

(5) Printing can be performed without a restriction on the nature of substrate on which a record is made.

(6) The ink exhibits a high rate of fixation.

(7) The ink gives images of good resolution and having good resistance to water, solvent (particularly alcohol), light, weather and abrasion.

However, images produced by conventional inks particularly by water-based inks, tend to form blots, dislocations or scratches, or to fade by water adhesion, mechanical friction, or exposure to light and an ink free from these drawbacks is an urgent requirement.

In addition to the above criteria, inks for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed recording over a long period of time.

Although a number of inks have been proposed to overcome these problems, none have been produced which meet all the foregoing requirements.

According to a second feature of the present invention there is provided an ink comprising a water-soluble dye of Formula I.

It is possible, by use of a dye of Formula I to obtain an ink having an improved solution stability, particularly during a prolonged storage in concentrated form, and having excellent recording properties, particularly ejection stability, ejection responsiveness and continuous recording workability.

The present ink is of practical importance and gives images having good water resistance, alcohol resistance and light resistance.

The present ink preferably comprises the dye and a liquid medium, such as water, an organic solvent or a mixture thereof. The dye of the first feature of the present invention has especially good solution stability in the above-mentioned liquid media, thereby improving the ejection stability of the ink and reducing the incidence of plugging of the ejecting orifice even after a long period of storage in the recording apparatus.

The amount of the dye in the ink is determined in accordance with the desired optical density of the image, the type of recording device to be used, other components to be added, the required physical properties of ink, etc. But generally speaking, a suitable dye content is in the range of 0.5–20%, preferably 0.5–15%, and especially 1–10%, by weight based on the total weight of the ink.

The present ink can contain, besides the hereinbefore defined dye, other dyes selected from various types of known dyes such as direct dyes, acid dyes, and the like but preferably contain only dye in accordance with the first aspect of the present invention or dyes having similar performance characteristics in ink jet printing.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazol-idinone; polyalkylene glycols such as polyethylene glycol and polypropylene glycol; alkylene glycols and thioglycols containing $C_2$–$C_6$ alkylene groups such as ethylene glycol, propylene glycol, butylene glycol, triethylene glycol; thiodiglycol, hexylene glycol, and diethylene glycol; other polyols such as glycerol, 1,2,6-hexanetriol; and $C_{1-4}$-alkyl ethers of polyhydric alcohols such as 2-ethoxyethanol, 2-methoxy-2-ethoxyethanol, 2-ethoxy-2-ethoxyethanol, 2-methoxy-2-ethoxy-2-ethoxyethanol and 2-ethoxy-2-ethoxy-2-ethoxyethanol.

Preferred water-soluble organic solvents among these are glycols and glycol ethers, such as ethylene glycol, diethylene glycol, triethylene glycol and 2-methoxy-2-ethoxy-2-ethoxyethanol; polyethylene glycols with molecular weights up to 500; and heterocyclic ketones such as N-methylpyrrolidone and 1,3-dimethyl-2-imidazolidione. Preferred specific solvent mixtures are a binary mixture of water and diethylene glycol and a tertiary mixture of water, diethylene glycol and N-methyl-pyrrolidone.

The present ink preferably contains in from 5–95%, preferably 10–80%, and especially 20–50%, by weight of the water soluble organic solvent based on the total weight of the ink.

The present ink, prepared from the components mentioned above, is generaly characterised by excellent and balanced recording performance characteristics i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine and triethanolamine; and pH conditioners, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-retentivity of the ink at the tip of the ejecting orifice. When the present ink is used for ink-jet recording of the type based on the action of thermal energy, the thermal properties, e.g. specific heat, coefficient of thermal expansion, and heat conductivity, of the ink may be modified by suitable additives.

If the present ink is to be applied by means of a writing tool, e.g. a pen, it may be necessary to modify the viscosity and the other physical properties in relation to the affinity of the ink for the recording substrate.

The present invention represents a significant step towards satisfying all the requirements stated above, that is to say, to providing an ink which does not plug capillary tubes or ejecting orifices, does not result in deterioration or formation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, certain preferred classes of the present inks are particularly suitable for use in an ink jet recording process utilising thermal energy because of their good long term heat stability.

The present invention in respect of the ink is further illustrated with reference to the following Examples in which all parts and percentages are by weight unless other wise indicated.

EXAMPLES 5

Inks were prepared, using the Dyes 1 to 4, as described in Examples 1 to 4 above, and the following ingredients:
Dye: 5 parts
Diethylene glycol: 35 parts
Deionised water: 60 parts.

The above-mentioned inks were prepared by thorough mixing of the ingredients, filtering the solution under pressure through a Teflon filter (pore size: 1 micron) and degassing the filtered ink, in vacuo. For each of the inks the following five characteristics, $T_1$-$T_5$, were measured using a recording apparatus having an on-demand type of recording head (50 micron-diameter ejecting orifice, piezo-oscillator driving voltage 60 V, frequency 4 KHz). Each ink gave good results in each test.

$T_1$—Prolonged Storage Stability

Each ink was sealed separately in a glass container and stored at $-30°$ C. and at $60°$ C. for 6 months. In each case there was no appreciable separation of any insoluble matter or any change in physical properties and colour.

$T_2$—Ejection Stability

Each ink was subjected to continuous recording tests at room temperature, $5°$ C., and $40°$ C. for 24 hours. Each ink gave high quality images constantly throughout the test period at each temperature.

$T_3$—Ejection Responsiveness

Each ink was subjected to intermittent ejection at two-second intervals and ejection after standing for two months and each ink showed stable uniform recording without causing plugging of the orifice.

$T_4$—Quality of Recorded Image

Images recorded on the following three types of recording paper were of high optical density and sharp and clear in all cases. Each image, after exposure to ambient light in a room for three months, showed a reduction in optical density not greater than 1%. Results of immersing the recorded papers in water for one minute showed a very little blotting of the images.

| Paper | Supplier |
| --- | --- |
| IJ recording paper type S | Mitsubishi Paper Mills Ltd. |
| IJ recording paper type M | Mitsubishi Paper Mills Ltd. |
| IJ recording paper type L | Mitsubishi Paper Mills Ltd. |

$T_5$—Fixing Properties for Recording Member

Images recorded on the above-mentioned three types of recording paper were rubbed with a finger 15 seconds after recording, and without forming any smudges or blots, indicating the excellent fixation properties of the images.

EXAMPLE 6

An element for transforming electric energy into thermal energy was prepared on an alumina substrate as follows.

A $SiO_2$ (lower) layer 5 microns thick was formed over the alumina substrate by sputtering and a 1000 A $HfB_2$ layer, as a heat generating resistor layer, and a 3000 A aluminum layer, as an electrode, were successively laid thereover. A heat generating resistor pattern having size of $50 \times 300$ microns was formed by selective etching of the aluminum layer. A $SiO_2$ layer 3500 A thick, as a protective (upper) layer, was then laid thereover. A print head was formed by bonding a glass plate on which grooves 50 microns wide and 50 microns deep had been engraved onto the $SiO_2$ protective layer in register with the etched pattern on the heat generating resistor. The tip surface of orifice was then polished so that the distance between the tip of heat generating resistor and the tip surface of orifice was 250 microns.

The print head was operated by applying printing signals of $40 \ V \times 10^{-5}$ sec rectangular voltage pulses at a cycle of $2 \times 10^{-4}$ sec. The print head operated normally and without blockage for 160 hours using an ink having the following composition:

Dye 1 (decomp'n temp: 280° l C.): 5 parts
Diethylene glycol: 25 parts
N-methyl-2-pyrrolidone: 20 parts
Water: 50 parts.

In a comparative test the print head operated satisfactorily for only 10 hours, under the same conditions as above, using an ink having the same composition as the above ink except for the replacement of Dye 1 with a dye of the formula:

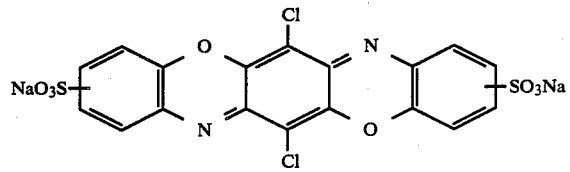

EXAMPLE 7

The print head was operated in the same way as in Example 6 using inks of the same recipe except that Dye 1 is replaced, in each case, by a dye listed in Table 1, using a printing signal of $50 \ V \times 10^{-5}$ sec rectangular voltage pulses at a cycle of $2 \times 10^{-4}$ sec. The resulting satisfactory operating periods are shown in Table 1.

TABLE 1

| Composition of ink | | Satisfactory |
| --- | --- | --- |
| Dye No. | Content (wt %) | Operating Period (hours) |
| 1 | 5 | 140 |
| 1 | 6 | 120 |
| 2 | 5 | 170 |
| 2 | 6 | 120 |
| 3 | 5 | 150 |
| 3 | 6 | 120 |
| 4 | 5 | 160 |
| 4 | 6 | 150 |

EXAMPLES 8-13

Inks having the compositions defined in Table 2 were prepared and tested for properties $T_1$-$T_5$, in the same manner as in Example 5.

The results indicated that all these inks have good characteristics, and particularly excellent recording performance, fixation properties and sharpness of image.

TABLE 2

| Example No. | Dye No. (parts) | Liquid medium and other components (parts) |
| --- | --- | --- |
| 8 | 1 (3) | Water (62)<br>Ethylene glycol (39)<br>1,2,6-hexanetriol (5) |
| 9 | 2 (4) | Water (61)<br>Glycerol (25)<br>Triethanolamine (10) |
| 10 | 3 (3) | Water (67)<br>Diethylene glycol (30)<br>Methyl p-hydroxybenzoate (0.1) |
| 11 | 4 (2) | Water (68)<br>Triethylene glycol monomethyl ether (30)<br>Polyoxyethylene nonylphenol ether (0.1) |
| 12 | 1 (3) | Water (72)<br>Propylene glycol (20)<br>Dimethylformamide (5) |
| 13 | 2 (3) | Water (57)<br>Ethyl alcohol (10)<br>Glycerol (30) |

TABLE 2-continued

| Example No. | Dye No. (parts) | Liquid medium and other components (parts) |
|---|---|---|
| | | Sodium dehydroacetate (0.1) |

EXAMPLE 14

The inks prepared in Examples 5 and 7 to 13 were charged separately into commercial fountain pens and records were made on plain paper. The results showed no blotting of image and high rates of absorption of ink in each case.

We claim:

1. An ink comprising water-soluble dye, free from cellulose reactive groups, of the formula:

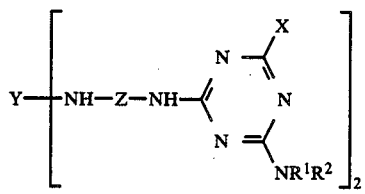

wherein $R^1$ is $-(C_aH_{2a}O)_m(C_bH_{2b}O)_nH$, $R^2$ is H or $-(C_aH_{2a}O)_m(C_bH_{2b}O)_nH$, or $R^1$ and $R^2$ together with the nitrogen atom form a morpholine ring a and b are different and from 1 to 8 m is from 1 to 10;

n is from 0 to 9;

Y is a triphendioxazinylene (TPD) group;

M is H, ammonium, or a metal;

X is $NR^1R^2$, alkoxy, $NR^3R^4$ in which $R^3$ and $R^4$ are each independently selected from H, alkyl, aryl and heteroaryl, or the residue of a mono- or dis-azo chromophore comprising benzene, naphthalene or mono- or bi-cyclic heteroaryl diazo and coupling components, linked to the triazine nucleus through a primary or secondary amine linking group; and Z is an alkylene, arylene or aralkylene group.

2. An ink comprising a dye according to claim 1, suitable for a recording system of the type in which an ink is ejected from a small orifice in the form of droplets directed towards a substrate on which an image is to be formed.

3. A writing or printing ink comprising a water-soluble dye according to claim 1 and a water or water-soluble organic solvent.

4. An ink according to claim 3 wherein the water-soluble organic solvent is a polyhydric alcohol.

5. An ink according to claim 4 containing from 0.5% to 20% by weight of the dye.

6. A method of printing which comprises ejecting an ink according to claim 2, from a small orifice in the form of droplets directed towards a substrate on which an image is to be formed.

* * * * *